(12) United States Patent
Liu et al.

(10) Patent No.: US 9,182,105 B1
(45) Date of Patent: Nov. 10, 2015

(54) LIGHT SOURCE MODULE

(71) Applicants: Hung-Wei Liu, Hsin-Chu (TW); Chin-Ku Liu, Hsin-Chu (TW)

(72) Inventors: Hung-Wei Liu, Hsin-Chu (TW); Chin-Ku Liu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 14/332,398

(22) Filed: Jul. 16, 2014

(30) Foreign Application Priority Data

Apr. 30, 2014 (CN) .......................... 2014 1 0180679

(51) Int. Cl.
| | | |
|---|---|---|
| *F21V 13/00* | (2006.01) | |
| *F21V 13/10* | (2006.01) | |
| *F21V 13/12* | (2006.01) | |
| *G02F 1/1335* | (2006.01) | |
| *G09G 3/34* | (2006.01) | |

(52) U.S. Cl.
CPC .................. *F21V 13/10* (2013.01); *F21V 13/12* (2013.01); *G02F 1/133615* (2013.01); *G09G 3/3413* (2013.01); *G02F 2001/133626* (2013.01); *G09G 2330/021* (2013.01)

(58) Field of Classification Search
CPC .. G02B 6/0013; G02B 6/0023; G02B 6/0028; G02B 6/0033; G02B 6/0096; F21V 7/04; F21V 7/09; F21V 7/005; F21V 7/025; F21V 13/02; F21V 13/10; F21V 13/12; G02F 1/133615; G02F 2001/133626; G09G 3/3413; G09G 2330/021

See application file for complete search history.

(56) References Cited

U.S. PATENT DOCUMENTS

2010/0059767 A1* 3/2010 Kawasaki et al. . G02F 1/133615
257/89

FOREIGN PATENT DOCUMENTS

| CN | 100389349 | 5/2008 |
|---|---|---|
| TW | 200907229 | 2/2009 |
| TW | M444487 | 1/2013 |
| TW | I386685 | 2/2013 |
| TW | I410714 | 10/2013 |

* cited by examiner

*Primary Examiner* — Thomas M Sember
(74) *Attorney, Agent, or Firm* — Jianq Chyun IP Office

(57) ABSTRACT

A light source module including an optical film and at least one light source unit is provided. The light source unit and the optical film enclose a space. The light source unit includes a reflecting device, at least one light bar, and a collimated unit. The reflecting device is disposed under the optical film. The light bar includes a plurality of light-emitting elements arranged along a third direction. The collimated unit extends along a direction parallel to the third direction and includes an upper reflective portion and a lower reflective portion. A shortest distance between one end of the lower reflective portion located adjacent to the reflecting device and the optical axis of the light-emitting elements along a second direction is defined as a first half light-emitting width, which is gradually increased along the third direction from a center portion of the collimated unit towards two sides thereof.

21 Claims, 9 Drawing Sheets

LIGHT SOURCE MODULE

CROSS-REFERENCE TO RELATED APPLICATION

This application claims the priority benefit of China application serial no. 201410180679.7, filed on Apr. 30, 2014. The entirety of the above-mentioned patent application is hereby incorporated by reference herein and made a part of this specification.

BACKGROUND

1. Technical Field

The invention relates to a light source module, and particularly relates to a light source module adapted for a display device.

2. Related Art

In recent years, along with enhancement of light-emitting efficiency and prolonging of service life of light-emitting diodes (LEDs), and due to characteristics and advantages of low power consumption, low pollution, high efficiency, high response speed, small volume, light weight and capable of being disposed on various surfaces, the LEDs are widely applied in various optical fields. Generally, the LEDs can be applied to various illumination devices and various planar displays in daily life, for example, liquid crystal displays (LCDs).

Taking the application of the LED in the LCD domain as an example, a backlight module of the LCD is a planar light source, and a basic operation principle thereof is to convert valid light of a linear light source or a point light source into a planar light source with high brightness and good uniformity. Generally, based on different light source positions, the light source modules are grouped into side incident type light source modules and direct type light source modules, wherein since a structure of the direct type backlight module is simple and a plurality sets of light sources can be adopted, the direct type backlight module may provide higher brightness and luminance, so that it is generally used in electronic products having a large size LCD.

Further, in the current direct type backlight module, the number of the used LEDs is decreased or a height of light cavity is decreased by configuring a secondary optical lens; however a product cost is increased. On the other hand, regarding a direct type backlight module without using the secondary optical lens, it has a thicker light cavity, or more LEDs have to be configured, so that system reliability is decreased. Moreover, regarding another direct type backlight module without using the secondary optical lens, it is mainly composed of LEDs, a reflective lampshade, a diffusion plate, and a bottom reflective sheet, in which the reflective lampshade reflects a light beam come from the LEDs to the bottom reflective sheet, and the bottom reflective sheet reflects the light beam to the diffusion plate for emitting light, such that the above direct type backlight module may have a lower cost and thinner thickness to achieve a great advantage. However, a brightness of the backlight module is determined by a brightness of a center point thereof, so that under a premise that a limited number of the LEDs are used, it is important to improve the brightness of the center point while considering light-emitting uniformity and front of screen (FOS) performance.

Taiwan Patent No. I410714B discloses a side incident type light source module including a light guide plate and a plurality of LED light sources. Taiwan Patent No. M444487U1 discloses a bar-shape lampshade, where one side of the bar-shape lampshade is recessed to form a reflective trough. Taiwan Patent Publication No. 200907229A discloses an LED device disposed in a reflective lampshade. Taiwan Patent No. I386685B discloses a casing including an extending reflective portion. China Patent No. CN100389349C discloses a reflective plate disposed on a substrate of a casing.

SUMMARY

The invention is directed to a light source module, which has advantages of thin light cavity, high brightness, and high uniformity.

Other objects and advantages of the invention can be further illustrated by the technical features broadly embodied and described as follows.

In order to achieve at least one of the objects or other objects, an embodiment of the invention provides a light source module including an optical film and at least one light source unit. The light source unit and the optical film enclose a space. The light source unit includes a reflecting device, at least one light bar, and a collimated unit. The reflecting device is disposed under the optical film. The light bar includes a plurality of light-emitting elements, where a direction of an optical axis of the light-emitting elements is defined as a first direction, and a direction perpendicular to the first direction and perpendicular to the optical film is defined as a second direction, and the light-emitting elements are arranged along a third direction perpendicular to the first direction and perpendicular to the second direction. The collimated unit extends along a direction parallel to the third direction, and includes an upper reflective portion and a lower reflective portion. One end of the upper reflective portion is located adjacent to the optical film, and the other end is located adjacent to the light-emitting elements. The lower reflective portion is disposed opposite to the upper reflective portion. One end of the lower reflective portion is located adjacent to the reflecting device, and the other end is located adjacent to the light-emitting elements. A shortest distance between one end of the lower reflective portion located adjacent to the reflecting device and the optical axis of the light-emitting elements along the second direction is defined as a first half light-emitting width, and the first half light-emitting width is gradually increased along the third direction from a center portion of the collimated unit towards two sides thereof. The light-emitting elements are located between the upper reflective portion and the lower reflective portion.

In an embodiment of the invention, a shortest distance between one end of the upper reflective portion located adjacent to the optical film and the optical axis of the light-emitting elements along the second direction is defined as a second half light-emitting width, and the second half light-emitting width is gradually decreased along the third direction from the center portion of the collimated unit towards two sides thereof.

In an embodiment of the invention, at least one first section line of the upper reflective portion and at least one second section line of the lower reflective portion on at least one reference plane formed by the first direction and the second direction are all aspherical curves, and the at least one first section line and the at least one second section line satisfy a following equation:

$$z = \frac{y^2/R}{1+\sqrt{1-(1+K)y^2/R^2}} + \sum_{n=2}^{10} A_{2n} y^{2n}$$

Where, a z-direction is the first direction, a y-direction is the second direction, K is a conic constant, R is a radius of curvature, $A_{2n}$ is a coefficient of $y^{2n}$, n is a positive integer greater than or equal to 2 and smaller than or equal to 10, and R is a constant greater than 0.

In an embodiment of the invention, a value of K in the equation ranges from −1 to −10, a value of quartic component coefficient $A_4$ ranges from 0 to 0.1. The quartic component coefficient $A_4$ is not 0 when K=−1, and K is not equal to −1 when the quartic component coefficient $A_4$=0.

In an embodiment of the invention, the number of the reference planes is plural, the number of the first section lines is plural and the first section lines all satisfy the equation, and at least one of the value of K and the value of $A_4$ of one of the first section lines is different from the value of K or the value of $A_4$ of another first section line.

In an embodiment of the invention, the values of K of the first section lines close to the center portion of the collimated unit are smaller than the values of K of the first section lines close to the two sides of the collimated unit, or the values of $A_4$ of the first section lines close to the center portion of the collimated unit are smaller than the values of $A_4$ of the first section lines close to the two sides of the collimated unit.

In an embodiment of the invention, the number of the reference planes is plural, the number of the second section lines is plural and the second section lines all satisfy the equation, and at least one of the value of K and the value of $A_4$ of one of the second section lines is different from the value of K or the value of $A_4$ of another second section line.

In an embodiment of the invention, the values of K of the second section lines close to the center portion of the collimated unit are greater than the values of K of the second section lines close to the two sides of the collimated unit, or the values of $A_4$ of the second section lines close to the center portion of the collimated unit are greater than the values of $A_4$ of the second section lines close to the two sides of the collimated unit.

In an embodiment of the invention, each two of the adjacent light-emitting elements have a pitch there between, and at least a part of the pitches are different.

In an embodiment of the invention, the pitches located adjacent to the center portion of the collimated unit are smaller than the pitches located adjacent to the two sides of the collimated unit.

In an embodiment of the invention, pitches between each two of the adjacent light-emitting elements are the same, and brightness of at least a part of the light-emitting elements is different.

In an embodiment of the invention, the brightness of a part of the light-emitting elements located adjacent to the center portion of the collimated unit is greater than the brightness of a part of the light-emitting elements located adjacent to the two sides of the collimated unit.

In an embodiment of the invention, the light-emitting elements include a plurality of first light-emitting elements and a plurality of second light-emitting elements, each of the first light-emitting elements is arranged between two adjacent second light-emitting elements, and pitches between each two of the adjacent second light-emitting elements are the same.

In an embodiment of the invention, the light source module further includes a processor, which is electrically connected to the first light-emitting elements and the second light-emitting elements, and is configured to adjust power of the first light-emitting elements and power of the second light-emitting elements according to a display situation.

In an embodiment of the invention, the second light-emitting element is a wide color gamut light-emitting element, the display situation includes a high brightness mode and a wide color gamut mode, and the processor is configured to turn on the first light-emitting elements when the display situation is the high brightness mode, and turn off the first light-emitting elements when the display situation is the wide color gamut mode.

In an embodiment of the invention, the display situation includes a high brightness mode and a low brightness mode, a ratio between power of each of the first light-emitting elements and power of each of the adjacent second light-emitting element is defined as a power ratio, and the processor adjusts the power ratio to 1 when determining the display situation to be the high brightness mode, and adjusts the power ratio to be less than 1 when determining the display situation to be the low brightness mode.

In an embodiment of the invention, the light source module further includes a side reflection unit. The side reflection unit is disposed opposite to the collimated unit, and is configured to connect the reflecting device and the optical film, where the side reflection unit, the optical film, and the light source unit enclose the space.

In an embodiment of the invention, an angle is included between the side reflection unit and the optical film, and the included angle is smaller than or equal to 100 degrees and greater than or equal to 90 degrees.

In an embodiment of the invention, a distance between the reflecting device and the optical film along the second direction is defined as a first depth, and on a reference plane formed by the second direction and the third direction, the first depth corresponding to the center portion of the collimated unit is greater than the first depth corresponding to the two sides of the collimated unit.

In an embodiment of the invention, the collimated unit has a light-emitting end and a light incident end opposite to the light-emitting surface, and each of the light-emitting elements provides a light beam for entering the collimated unit through the light incident end and entering the space through the light-emitting end.

In an embodiment of the invention, the light source module further includes a plurality of secondary lenses. The secondary lenses are disposed beside the light-emitting elements, and a part of the light beam provided by each of the light-emitting elements is transmitted to the reflecting device through the secondary lenses.

According to the above descriptions, the embodiment of the invention has at least one of the following advantages or effects. The light source module of the invention increases a brightness of a central area of the light source module by controlling each pitch between the light-emitting elements or the brightness of each light-emitting element. On the other hand, the light-emitting uniformity of the light source module is effectively improved through a structure design of the collimated unit, and by configuring the reflecting device and the side reflection unit, the light beam is distributed to the whole reflecting device, which avails improving a light-emitting uniformity of the light source module. Moreover, by configuring the processor, different modes of the light source module are adjusted according to the display situation, so as to satisfy an actual requirement of image frames on wide color gamut, light-emitting efficiency and light-emitting uniformity. In addition, the uniformity of the light source module is finely tuned by adjusting the surface of the reflecting device and configuring the secondary lens. Moreover, as a light guide plate is not required, the light source module has a lower cost. In case of different brightness requirements, the light source module only needs to replace the light bar without replacing other components, so as to satisfy different brightness requirements while considering the cost and practicability of the light source module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
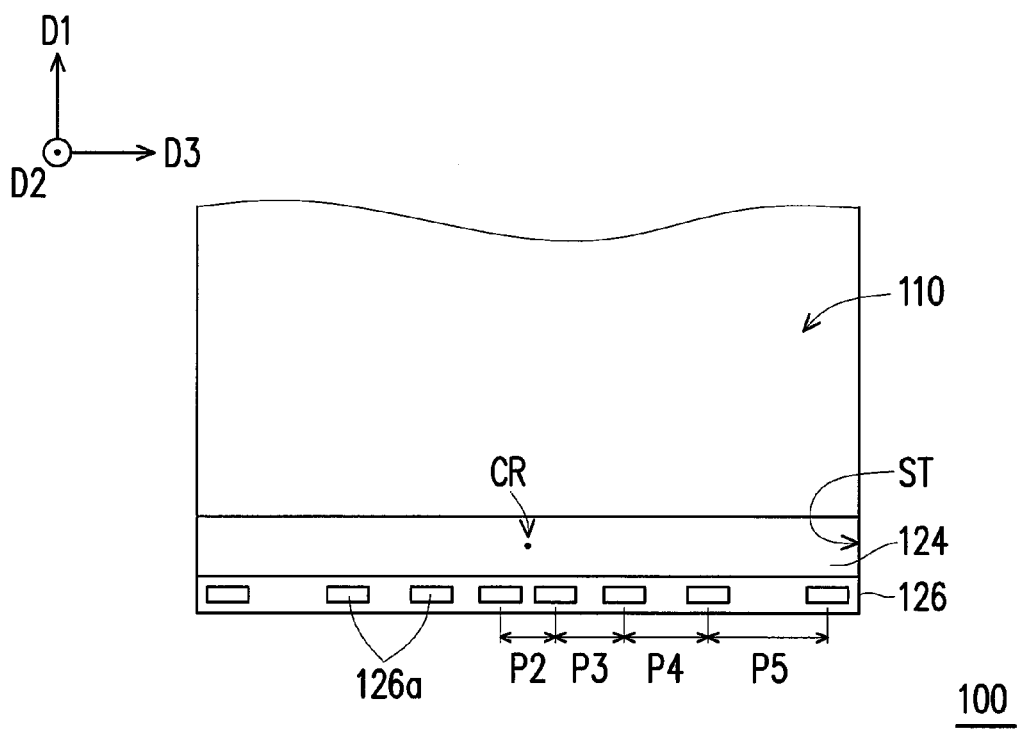
FIG. 1A is a top view of a light source module according to an embodiment of the invention.
Figure 1B:
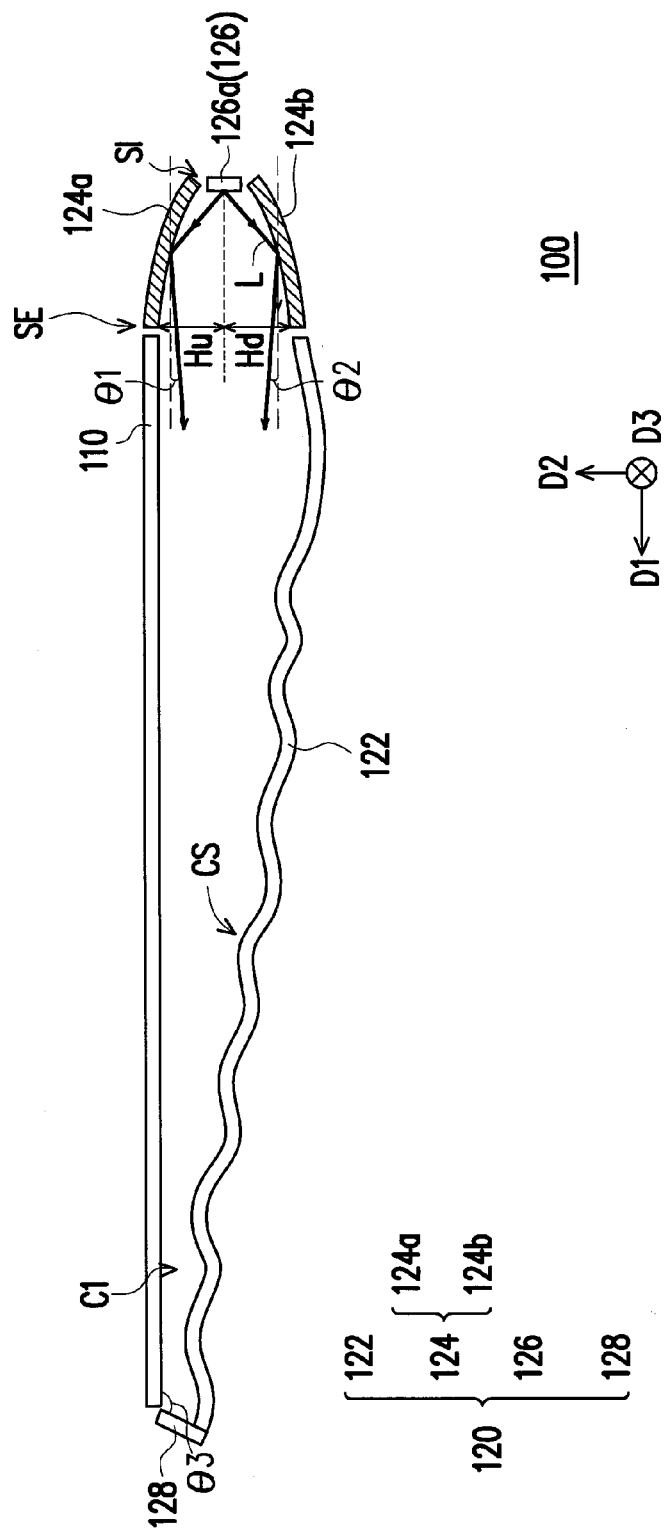
FIG. 1B is a cross-sectional view of the light source module of FIG. 1A.

FIG. 1A is a top view of a light source module according to an embodiment of the invention. FIG. 1B is a cross-sectional view of the light source module of FIG. 1A. Referring to FIG. 1A and FIG. 1B, the light source module 100 of the embodiment includes an optical film 110 and at least one light source unit 120, wherein the light source unit 120 includes a reflecting device 122, a collimated unit 124, at least one light bar 126, and a side reflection unit 128. For example, the light bar 126 includes a plurality of light-emitting elements 126a. For clarity's sake, in the embodiment, a direction of an optical axis of the light-emitting elements 126a is defined as a first direction D1, and a direction perpendicular to the first direction D1 and perpendicular to the optical film 110 is defined as a second direction D2, and the light-emitting elements 126a are arranged along a third direction D3 perpendicular to the first direction D1 and perpendicular to the second direction D2. Moreover, in the embodiment, the light-emitting elements 126a are, for example, a plurality of light-emitting diodes (LEDs).

On the other hand, as shown in FIG. 1A, in the embodiment, each two of the adjacent light-emitting elements 126a have a pitch (P2, P3, P4 or P5) there between, and at least a part of the pitches P2, P3, P4 and P5 are different. In other words, the light-emitting elements 126a can be the same, and only the pitches P2, P3, P4, and P5 are different. Variation of each of the pitches P2, P3, P4, and P5 of the light-emitting elements 126a may change a brightness distribution (light uniformity). For example, the smaller the pitches P2, P3, P4, and P5 of the light-emitting elements 126a are, the higher the brightness of the corresponding area is; conversely, the greater the pitches P2, P3, P4, and P5 of the light-emitting elements 126a are, the lower the brightness of the corresponding area is. Therefore, in the embodiment, the brightness distribution of the light source module 100 can be controlled by controlling the variation of each of the pitches P2, P3, P4, and P5 of the light-emitting elements 126a.

In detail, as shown in FIG. 1A, in the embodiment, the pitch P2 close to a center portion CR of the collimated unit 124 is smaller than the pitch P5 close to the two sides ST of the collimated unit 124. For example, in the embodiment, the pitches P2, P3, P4, and P5 are complied with a relationship of P2<P3<P4<P5, in this way, the brightness at the center portion CR of the light source module 100 is obviously enhanced, though the invention is not limited thereto. In another embodiment, the relationship of the pitches P2, P3, P4, and P5 may have other variations, for example, the pitches P2, P3, P4, and P5 are complied with a relationship of P2=P3<P4=P5 or P2<P3=P4<P5, or P2<P3=P4=P5. In other words, the relationship between the pitches P2, P3, P4, and P5 of the light-emitting elements 126a is not limited by the invention, and in other embodiments, as long as the pitches P2, P3, P4, and P5 of the light-emitting elements 126a can be adjusted to enhance the brightness at the center portion of the light source module, it is considered to cope with the spirit of the invention. Moreover, in the embodiment, according to different brightness requirements, the light bar 126 of the light source module 100 can be replaced or the pitches P2, P3, P4, and P5 can be changed to satisfy different brightness requirements without replacing other components, and meanwhile the cost and practicability of the light source module 100 are also taken into consideration.

On the other hand, referring to FIG. 1B, in the embodiment, the reflecting device 122 is disposed under the optical film 110, and the collimated unit 124 is disposed adjacent to the reflecting device 122 and the optical film 110. Further, in the embodiment, the light source unit 120 and the optical film 110 enclose a space C1. For example, in the embodiment, the side reflection unit 128 is disposed opposite to the collimated unit 124, and is configured to connect the reflecting device 122 and the optical film 110. In detail, the side reflection unit 128, the optical film 110 and the reflective device 122 and the collimated unit 124 of the light source unit 120 enclose the space C1.

In detail, in the embodiment, the collimated unit 124 extends along a direction parallel to the third direction D3, and includes an upper reflective portion 124a and a lower reflective portion 124b, wherein the lower reflective portion 124b is disposed opposite to the upper reflective portion 124a. In detail, in the embodiment, one end of the upper reflective portion 124a is located adjacent to the optical film 110, and the other end is located adjacent to the light-emitting elements 126a. One end of the lower reflective portion 124b is located adjacent to the reflecting device 122, and the other end is located adjacent to the light-emitting elements 126a, and the light-emitting elements 126a are located between the upper reflective portion 124a and the lower reflective portion 124b. Moreover, in the embodiment, the collimated unit 124 has a light-emitting end SE and a light incident end SI opposite to the light-emitting end SE, and each of the light-emitting elements 126a provides a light beam L for entering the collimated unit 124 through the light incident end SI and entering the space C1 through the light-emitting end SE. In the embodiment, the upper reflective portion 124a and the lower reflective portion 124b of the collimated unit 124 are all aspherical curved surfaces, and the curved surfaces can be adjusted according to parameters such as the size and the maximum pitches P2, P3, P4, and P5, etc. of the light source module 100 to achieve a uniform brightness distribution. In other words, the structure design of the collimated unit 124 determines the whole uniformity and front of screen (FOS) performance of the light source module 100.

Figure 2:
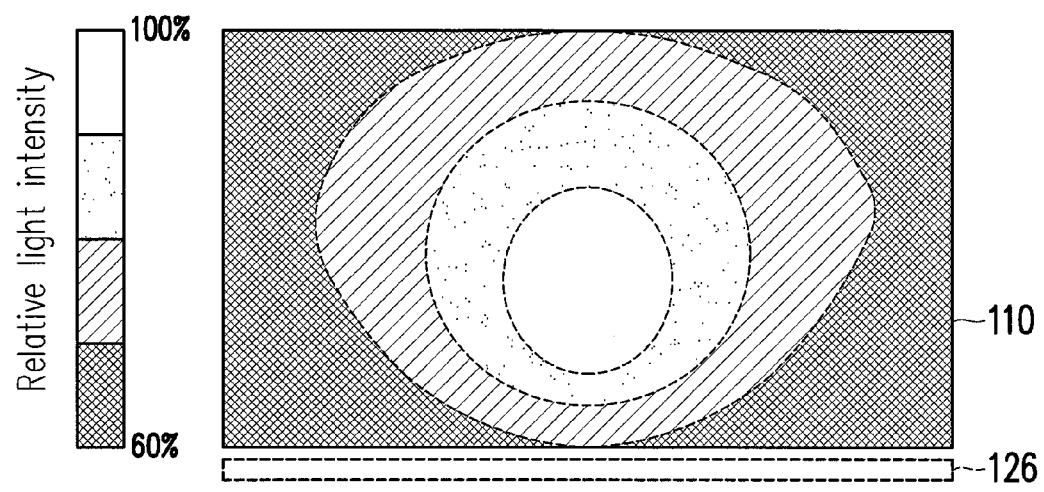
FIG. 2 is a light intensity simulated distribution diagram of a light source module.

FIG. 2 is a light intensity simulated distribution diagram of the light source module. For example, when cross sections of the upper reflective portion 124a and the lower reflective portion 124b of the collimated unit 124 at different zones AZ, BZ, CZ (referring to FIG. 3A) are the same, the light source module 100 presents an inverted cone brightness distribution (shown in FIG. 2). Now, regarding the brightness of the regions close to the light bar 126, the further the region is closer to two sides of the light source module 100, the lower the brightness thereof is. Therefore, in order to enhance the brightness of the regions located at the two sides of the light source module 100 and close to the light bar 126, the whole uniformity of the light source 100 is adjusted by controlling a variation of the cross sections of the upper reflective portion 124a and the lower reflective portion 124b located at different zones of the collimated unit 124. Detailed structure designs of the collimated unit 124 are described below with reference of FIG. 3A to FIG. 3D.

Figure 3A:
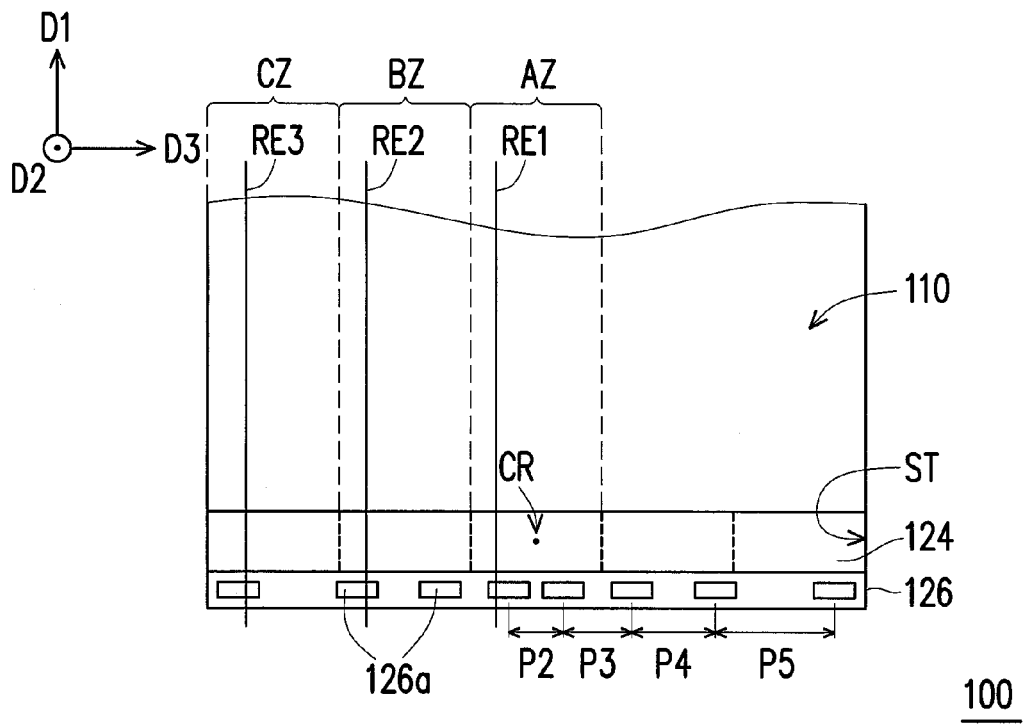
FIG. 3A is a top view of a plurality of different zones of a collimated unit of FIG. 1A.
Figure 3B:
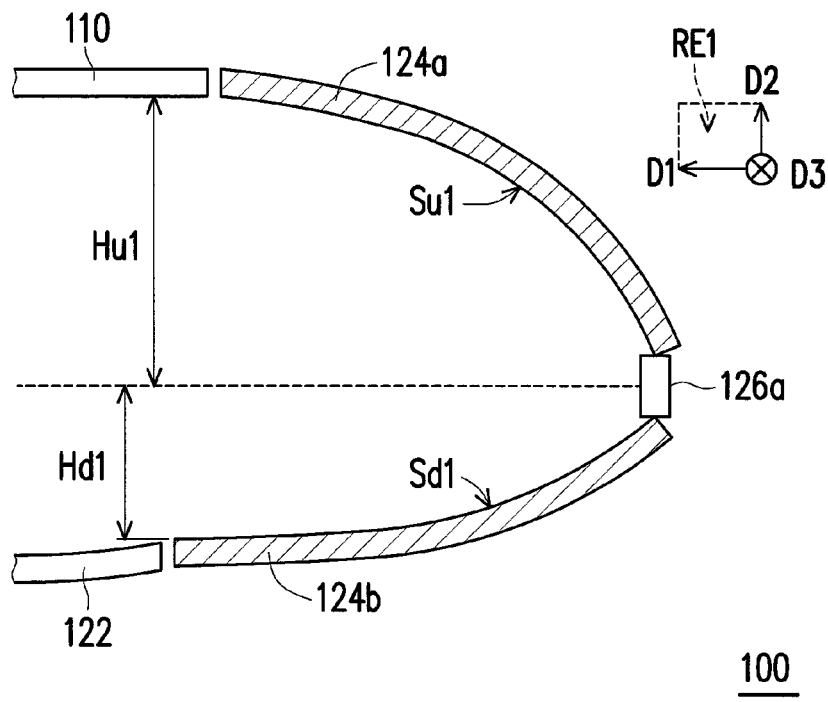
FIG. 3B, FIG. 3C, and FIG. 3D are cross-sectional views of the collimated unit of FIG. 3A sectioned by different reference planes.
Figure 3C:
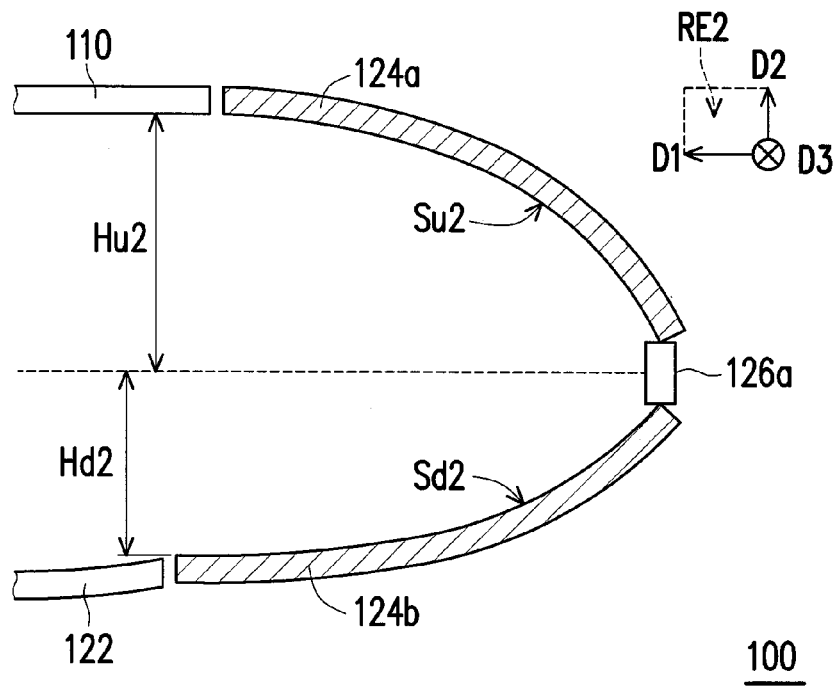
Figure 3D:
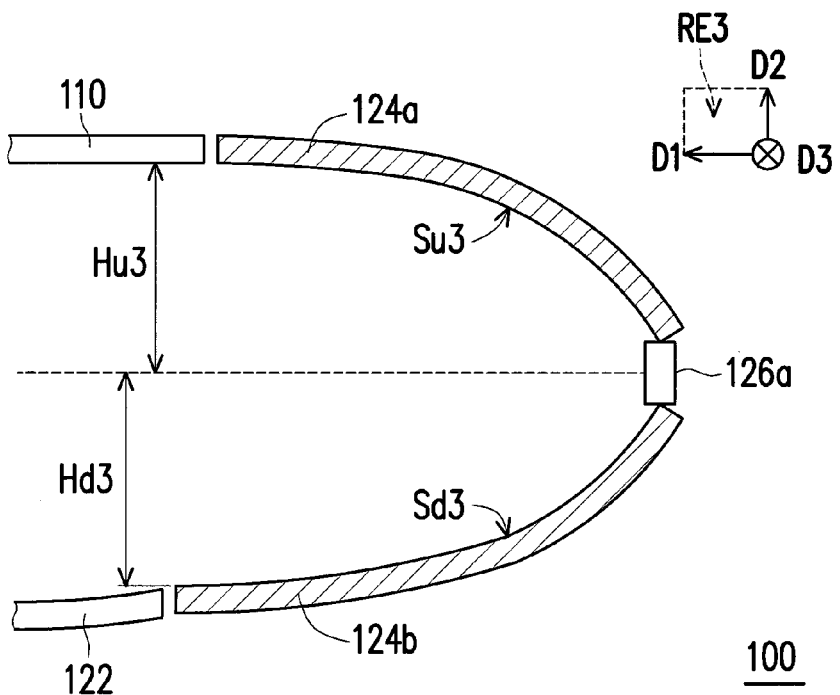

FIG. 3A is a top view of a plurality of different zones of the collimated unit of FIG. 1A. FIG. 3B, FIG. 3C, and FIG. 3D are cross-sectional views of the collimated unit of FIG. 3A sectioned by different reference planes. In detail, referring to FIG. 1B and FIG. 3A to FIG. 3D, in the embodiment, the collimated unit 124 includes a plurality of different zones AZ, BZ, and CZ, where the cross sections of the lower reflective portion 124b at different zones AZ, BZ, and CZ are different. For example, as shown in FIG. 1B, in the embodiment, a shortest distance between one end of the lower reflective portion 124b located adjacent to the reflecting device 122 and the optical axis of the light-emitting elements 126a along the second direction D2 is defined as a first half light-emitting width Hd, and the first half light-emitting width Hd is gradually increased along the third direction D3 from a center portion CR of the collimated unit 124 towards two sides ST thereof. In other words, as shown in FIG. 3B to FIG. 3D, a first half light-emitting width Hd1 of the lower reflective portion 124b located at the zone AZ is smaller than first half light-emitting widths Hd2 and Hd3 of the lower reflective portions 124b located at the zone BZ and the zone CZ.

On the other hand, in the embodiment, the structure of the upper reflective portions 124a located at the zones AZ, BZ, and CZ can be selectively adjusted to achieve a variation of the cross sections thereof. However, it should be noticed that in order to achieve a uniform brightness distribution, the variation trend of the upper reflective portions 124a in the zones AZ, BZ, and CZ is opposite to the variation trend of the lower reflective portions 124b in the zones AZ, BZ, and CZ. For example, as shown in FIG. 1B, in the embodiment, a shortest distance between one end of the upper reflective portion 124a located adjacent to the optical film 110 and the optical axis of the light-emitting elements 126a along the second direction D2 is defined as a second half light-emitting width Hu, and the second half light-emitting width Hu is gradually decreased along the third direction D3 from the center portion CR of the collimated unit 124 towards two sides ST thereof. In other words, as shown in FIG. 3B to FIG. 3D, a second half light-emitting width Hu1 of the upper reflective portion 124a located at the zone AZ is greater than second half light-emitting widths Hu1 and Hu3 of the upper reflective portions 124a located at the zone BZ and the zone CZ.

In detail, referring to FIG. 3B and FIG. 3D, in the embodiment, at least one first section line Su1, Su2, Su3 of the upper reflective portion 124a and at least one second section line Sd1, Sd2, Sd3 of the lower reflective portion 124b of the collimated unit 124 on at least one reference plane RE1, RE2, RE3 formed by the first direction D1 and the second direction D2 are all aspherical curves. For example, the first section line Su1 and the second section line Sd1 can be cut through the reference plane RE1 in the zone AZ, the first section line Su2 and the second section line Sd2 can be cut through the reference plane RE2 in the zone BZ, and the first section line Su3 and the second section line Sd3 can be cut through the reference plane RE3 in the zone CZ. Moreover, the first section lines Su1, Su2, and Su3 and the second section line Sd1, Sd2, and Sd3 satisfy a following equation:

$$z = \frac{y^2/R}{1+\sqrt{1-(1+K)y^2/R^2}} + \sum_{n=2}^{10} A_{2n}y^{2n}$$

Where, a z-direction is the first direction D1, a y-direction is the second direction D2, K is a conic constant, R is a radius of curvature, $A_{2n}$ is a coefficient of $y^{2n}$, n is a positive integer greater than or equal to 2 and smaller than or equal to 10, and R is a constant greater than 0. For example, in the embodiment, a value of K ranges from −1 to −10, a value of quartic component coefficient $A_4$ ranges from 0 to 0.1. The quartic component coefficient $A_4$ is not 0 when K=−1, and K is not equal to −1 when the quartic component coefficient $A_4$=0.

In other words, in the embodiment, the structure design of the collimated unit 124 does not include a situation of parabolic surface (K=−1, $A_4$=0) since the collimated unit of the parabolic surface is liable to increase a whole thickness of the light source module and a border width thereof along the first direction D1. Moreover, according to the existing technique, the parabolic surface (K=−1, $A_4$=0) is generally used to converge the light beam L, and the light-emitting element 126a is disposed at a focal point of the parabolic surface. Under a premise that the light-emitting element 126a is an ideal light source (i.e. an infinitesimal point light source), the light beam L reflected by the parabolic surface is parallel to the first direction D1. However, since the light-emitting element 126a has a certain size, the light beam L reflected by the parabolic surface is not completely a parallel light, and the parabolic surface cannot effectively mitigate a bright belt phenomenon of a region close to the light bar. On the other hand, if the light beams L reflected by the parabolic surface are all collimated light beams, the light beams L are only distributed on a partial region of the reflecting device 122, which may cause a problem of uneven light-emitting effect. Therefore, based on the structure design of the collimated unit 124 of the embodiment, the problem that the parabolic surface cannot effectively mitigate the bright belt phenomenon at the region close to the light bar or the problem of uneven light-emitting effect are avoided.

In detail, in the embodiment, since the cross sections of the lower reflective portions 124b at different zones AZ, BZ, and CZ are different, at least one of the value of K and the value of $A_4$ of one of the second section lines Sd1, Sd2, and Sd3 is different from the value of K or the value of $A_4$ of another one of the second section lines Sd1, Sd2, and Sd3. Further, the greater the value of K or the value of $A_4$ is, the smaller the first half light-emitting width Hd is. Moreover, the smaller the first half light-emitting width Hd is, the farther an illumination region of the light beam L reflected by the lower reflective portion 124b of the corresponding zone is away from the light bar 126. In detail, in the embodiment, the value of K of the second section line Sd1 close to the center portion CR of the collimated unit 124 is greater than the values of K of the second section lines Sd2 and Sd3 close to the two sides ST of the collimated unit 124, or the value of $A_4$ of the second section line Sd1 close to the center portion CR of the collimated unit 124 is greater than the values of $A_4$ of the second section lines Sd2 and Sd3 close to the two sides ST of the collimated unit 124. For example, in an embodiment, the values of K and $A_4$ of the second section line Sd1 close to the center portion CR of the collimated unit 124 are K=−1.1, $A_4$=0.005, the values of K and $A_4$ of the second section line Sd2 close to the two sides ST of the collimated unit 124 are K=−1.1, $A_4$=0.003, and the values of K and $A_4$ of the second section line Sd3 close to the two sides ST of the collimated unit 124 are K=−1.2, $A_4$=0.003. In other words, in the embodiment, regarding the illumination regions of the lower reflective portions 124b at the zones AZ, BZ, and CZ corresponding to the second section lines Sd1, Sd2, and Sd3, the one corresponding to the first half light-emitting width Hd3 of the second section line Sd3 at the zone CZ is the maximum, and is closest to the light bar 126. It should be noticed that the aforementioned value ranges are only used as an example, and are not used for limiting the invention.

On the other hand, similarly, since the cross sections of the upper reflective portions 124a at different zones AZ, BZ, and CZ can also be different, at least one of the value of K and the value of $A_4$ of one of the first section lines Su1, Su2, and Su3 is different from the value of K or the value of $A_4$ of another one of the first section lines Su1, Su2, and Su3. However, a variation trend of the illumination region caused by variation of the first section lines Su1, Su2, and Su3 is opposite to the variation trend of the illumination region caused by variation of the second section lines Sd1, Sd2, and Sd3. Namely, the smaller the second half light-emitting width Hu is, the closer the illumination region of the light beam reflected by the upper reflective portion 124a of the corresponding zone is away from the light bar 126. In detail, in the embodiment, the value of K of the first section line Su1 close to the center portion CR of the collimated unit 124 is smaller than the values of K of the first section lines Su2 and Su3 close to the two sides ST of the collimated unit 124, or the value of $A_4$ of the first section line Su1 close to the center portion CR of the collimated unit 124 is smaller than the values of $A_4$ of the first section lines Su2 and Su3 close to the two sides ST of the collimated unit 124. For example, in an embodiment, the values of K and $A_4$ of the first section line Su1 close to the center portion CR of the collimated unit 124 are K=−1.2, $A_4$=0.003, the values of K and $A_4$ of the first section line Su2 are K=−1.1, $A_4$=0.003, and the values of K and $A_4$ of the first section line Su3 are K=−1.1, $A_4$=0.004. In other words, in the embodiment, regarding the illumination regions of the upper reflective portions 124b at the zones AZ, BZ, and CZ corresponding to the first section lines Su1, Su2, and Su3, the one corresponding to the first half light-emitting width Hu3 of the first section line Su3 at the zone CZ is the minimum, and is closest to the light bar 126. It should be noticed that the aforementioned value ranges are only used as an example, and are not used for limiting the invention.

Figure 3E:
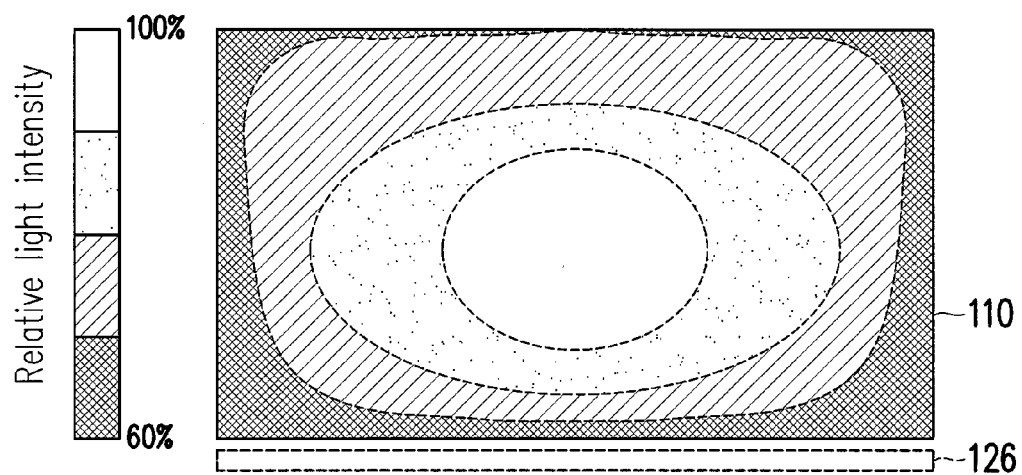
FIG. 3E is a light intensity simulated distribution diagram of the light source module of FIG. 1A.

FIG. 3E is a light intensity simulated distribution diagram of the light source module of FIG. 1A. In other words, in order to enhance the brightness of the regions located at the two sides of the light source module 100 and close to the light bar 126, variation of the cross sections of the upper reflective portion 124a and the lower reflective portion 124b located at different zones AZ, BZ, and CZ of the collimated unit 124 can be modulated. In detail, in the embodiment, the cross section variations of the lower reflective portions 124b of the collimated unit 124 from the center portion CR to the two sides ST are sequentially the second section lines Sd1, Sd2, and Sd3, and the cross section variations of the upper reflective portions 124a of the collimated unit 124 from the center portion CR to the two sides ST are sequentially the first section lines Su1, Su2, and Su3. In this way, the brightness of the regions located at the two sides of the light source module 100 and close to the light bar 126 is enhanced, and the brightness distribution of the light source module 100 presents a rectangular distribution, so as to effectively improve the light-emitting uniformity of the light source module 100. However, the invention is not limited thereto. For example, in other embodiments, the upper reflective portion 124a or the lower reflective portion 124b sectioned by the reference plane RE1 and located close to the center portion CR of the collimated unit 124 may respectively select a variation having one of the first section line Su1 and the second section line Sd1 or a combination thereof, the upper reflective portion 124a or the lower reflective portion 124b sectioned by the reference plane RE3 and located close to the two sides ST of the collimated unit 124 may respectively select a variation having one of the first section line Su3 and the second section line Sd3 or a combination thereof, and the upper reflective portion 124a or the lower reflective portion 124b sectioned by the reference plane RE2 and located close to the two sides ST of the collimated unit 124 may respectively select a variation having one of the first section line Su2 and the second section line Sd2 or a combination thereof.

Moreover, in the aforementioned embodiment, although a situation that the cross section of the lower reflective portion 124b or the upper reflective portion 124a of the collimated unit 124 has a three-step variation is taken as an example for descriptions, the invention is not limited thereto. In other embodiments, the cross section of the lower reflective portion 124b or the upper reflective portion 124a of the collimated unit 124 may have a four-step variation or a progressive variation, such that the light source module 100 may achieve a more subtle uniformity adjustment, which is not described in detail.

On the other hand, referring to FIG. 1B again, by configuring the collimated unit 124, the light source module 100 may have a better light converging effect. In detail, as shown in FIG. 1B, a first angle θ1 is included between the light beam L reflected by the upper reflective portion 124a of the collimated unit 124 and a direction parallel to the optical film 110 (i.e. the first direction D1), and a second angle θ2 is included between the light beam L reflected by the lower reflective portion 124b of the collimated unit 124 and the direction parallel to the optical film 110 (i.e. the first direction D1). In the embodiment, the first angle θ1 is, for example, greater than 0 degree and smaller than 5 degrees, and the second angle θ2 is, for example, greater than 0 degree and smaller than 5 degrees. In this way, the collimated unit 124 avails converting the light beam L and transmits the light beam L to the reflecting device 122 and the side reflection unit 128 disposed opposite to the collimated unit 124. It should be noticed that the aforementioned value ranges are only used as an example, and are not used for limiting the invention.

In detail, in the embodiment, a plurality of concave-convex structures CS are selectively configured on the reflecting device 122 to fine-tune the brightness distribution of the planar light source provided by the light source module 100. Since the concave-convex structures CS are connected in pairs and are continuously distributed, the brightness distribution of the planar light source provided by the light source module 100 may have a continuous and smooth variation, i.e. a brightness difference of the concave-convex structures CS are not liable to be perceived, though the invention is not limited thereto. In other embodiments, the reflecting device 122 can also be a smooth curved surface.

On the other hand, when the light beam L is transmitted to the side reflection unit 128, the side reflection unit 128 is configured to reflect the light beam L to the reflecting device 122. For example, in the embodiment, the side reflection unit 128 is made of a metal material (for example, silver, aluminium) through spray plating, or is formed by adhering a mirror reflective sheet (for example, a reflective sheet with high reflectivity, a silver film, or an aluminium film) on a frame border. The greater a third angle θ3 included between the side reflection unit 128 and the optical film 110 within the space C1 is, the easier the light beam L reflected by the side reflection unit 128 is transmitted to the reflecting device 122 at a region close to the side reflection unit 128. In the embodiment, the third angle θ3 is, for example, smaller than or equal to 100 degrees and greater than or equal to 90 degrees. It should be noticed that the above value range is only used as an example, and is not used for limiting the invention. Moreover, in the embodiment, the side reflection unit 128 is not limited to be a plane, and in other embodiments, the side reflection unit 128 can also be a curved surface, and the curved surface is, for example, a concave surface or a convex surface, or a continuous curved surface formed by smoothly connecting the concave surface and the convex surface, which is not limited by the invention.

On the other hand, referring to FIG. 1B again, a plane where the optical film 110 is located is a light-emitting surface of the light source module 100. The optical film 110 is, for example, at least one diffusion sheet, such that the light beam L passing there through may have a diffusion effect, so as to enhance uniformity of the planar light source provided by the light source module 100. In other embodiments, the light source module 100 may further include other optical films according to an actual design requirement. For example, at least one prism sheet (not shown) is disposed on the diffusion sheet of the light source module 100 to reduce a divergence angle of the light beam L, so as to improve a whole brightness of the light source module 100.

Moreover, in the embodiment, an area of an orthogonal projection of the reflecting device 122 on the plane where the optical film 110 is located is, for example, greater than or equal to an area of the optical film 110, so as to ensure that the whole optical film 110 can receive the light beam L reflected by reflecting device 122. On the other hand, if the surface of the reflecting device 122 that faces the optical film 110 is designed as a diffusion surface, it avails improving diffusibility of the light beam L, and the diffusion surface is formed through adhering a white reflective sheet (for example, Toray E6D6) or through injection of a white plastic material (for example, Polycarbonate URC2500) or formed by vacuum forming a white plastic reflector, which is not limited by the invention.

In this way, based on the structure design of the collimated unit 124 of the light source module 100 of the embodiment, the light-emitting uniformity of the light source module 100 is effectively enhanced, and by configuring the reflecting device 122 and the side reflection unit 128, the light beam L is distributed to the entire reflecting device 122, which avails improving the light-emitting uniformity of the light source module 100. Moreover, different from a general light source module where the light beam is transmitted within a light guide plate, in the light source module 100 of the embodiment, the light beam L is transmitted within the space C1 filled with a transmission medium of air. Therefore, in the light source module 100 of the embodiment, the light guide plate is omitted to achieve lower cost.

Figure 4:
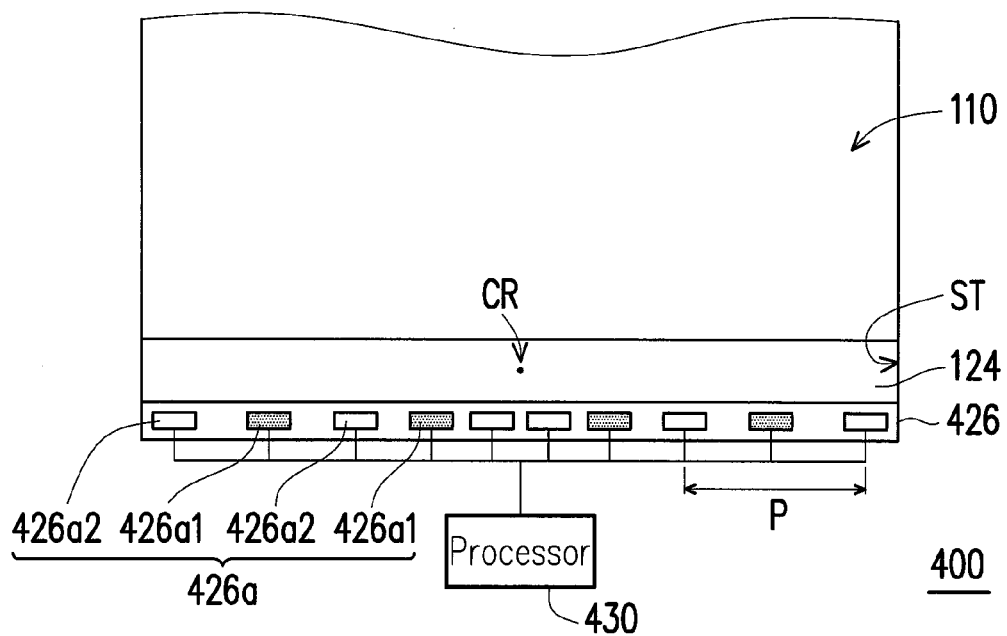
FIG. 4 is a structural schematic diagram of a light source module according to another embodiment of the invention.

FIG. 4 is a structural schematic diagram of a light source module according to another embodiment of the invention. Referring to FIG. 4, the light source module 400 and a light bar 426 of the embodiment are similar to the light source module 100 and the light bar 126 of FIG. 1A, and differences there between as described as follow. In the embodiment, light-emitting elements 426a of the light bar 426 include a plurality of first light-emitting elements 426a1 and a plurality of second light-emitting elements 426a2. Each of the first light-emitting elements 426a1 is arranged between two adjacent second light-emitting elements 426a2, and pitches P between each two of the adjacent second light-emitting elements 426a2 are the same. In the embodiment, the first light-emitting elements 426a1 are, for example, light-emitting diodes (LEDs) having yttrium aluminium garnet (YAG), and have a high light-emitting brightness, and the second light-emitting elements 426a2 are, for example, light-emitting diodes (LEDs) having a quantum dot material, RGB colors or other fluorescent materials such as high chroma phosphor, etc., and have a wide color gamut and a high color saturation.

Further, in the embodiment, the light source module 400 includes a processor 430. The processor 430 is electrically connected to the first light-emitting elements 426a1 and the second light-emitting elements 426a2, and configured to adjust power of the first light-emitting elements 426a1 and power of the second light-emitting elements 426a2 according to a display situation. For example, in the embodiment, the display situation includes a high brightness mode and a wide color gamut mode. The processor 430 is configured to turn on the first light-emitting elements 426a1 when the display situation is the high brightness mode. In this way, since the first light-emitting elements 426a1 and the second light-emitting elements 426a2 are all turned on, the electronic apparatus using the light source module 400 for illumination may have a higher brightness. On the other hand, the processor 430 is configured to turn off the first light-emitting elements 426a1 when the display situation is the wide color gamut mode. In this way, since the turned on second light-emitting elements 426a2 all have the wide color gamut and the high color saturation, a displayed image of the electronic apparatus using the light source module 400 for illumination may have a better color performance.

For example, in the embodiment, different image modes can be respectively predefined according to different image function requirements. In detail, when the electronic apparatus using the light source module 400 has a higher demand on image color saturation, the processor 430 determines the display situation to be the wide color gamut mode, and turns off the first light-emitting elements 426a1, such that the displayed image of the electronic apparatus may have better color performance. On the other hand, when the electronic apparatus using the light source module 400 does not require high color saturation, the processor 430 determines the display situation to be the high brightness mode, and turns on the first light-emitting elements 426a1, so as to suitably increase the brightness performance of the light source module 400.

Figure 5:
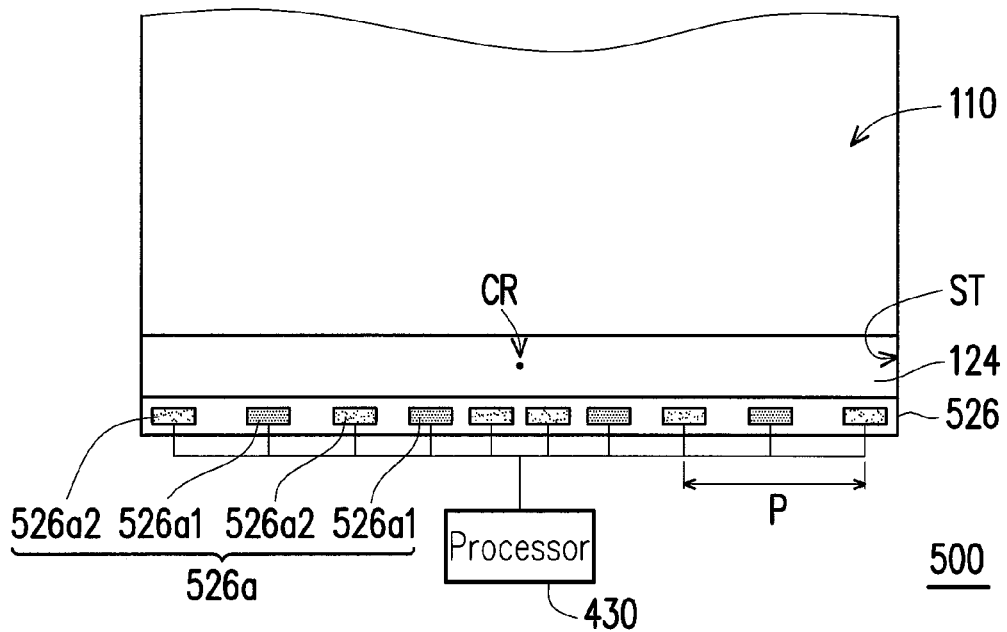
FIG. 5 is a structural schematic diagram of a light source module according to still another embodiment of the invention.

FIG. 5 is a structural schematic diagram of a light source module according to still another embodiment of the invention. Referring to FIG. 5, the light source module 500 and a light bar 526 of the embodiment are similar to the light source module 400 and the light bar 426 of FIG. 4, and differences there between as described as follow. In the embodiment, light-emitting elements 526a of the light bar 526 include a plurality of first light-emitting elements 526a1 and a plurality of second light-emitting elements 526a2. The first light-emitting elements 526a1 and the second light-emitting elements 526a2 may adopt the same light-emitting elements, and the display situation includes a high brightness mode and a low brightness mode. Moreover, a ratio between power of each of the first light-emitting elements 526a1 and power of each of the adjacent second light-emitting element 526a2 is defined as a power ratio, and the processor 430 adjusts the power ratio to 1 when determining the display situation to be the high brightness mode, and adjusts the power ratio to be less than 1 when determining the display situation to be the low brightness mode. A method of adjusting the power ratio of the first light-emitting element 526a1 and the second light-emitting element 526a2 is, for example, to adjust currents flowing through the first light-emitting element 526a1 and the second light-emitting element 526a2.

In other words, when the display situation is the high brightness mode, the processor 430 simultaneously turns on the first light-emitting elements 526a1 and the second light-emitting element 526a2. In this way, since the first light-emitting elements 526a1 and the second light-emitting element 526a2 are all turned on, the electronic apparatus using the light source module 500 for illumination may have a higher brightness. When the display situation is the low brightness mode, the processor 430 may also simultaneously turn on the first light-emitting elements 526a1 and the second light-emitting element 526a2, and decreases a light-emitting power of the first light-emitting elements 526a1. In this way, the whole brightness of the light source module 500 is decreased. On the other hand, since the pitches P between each two of the adjacent second light-emitting elements 526a2 having higher light-emitting power are the same, the light source module 500 also has better light-emitting uniformity. In this way, in the embodiment, those skilled in the art can select the high brightness mode or the low brightness mode according to the display situation and the actual requirement, and details thereof are not repeated.

Figure 6:
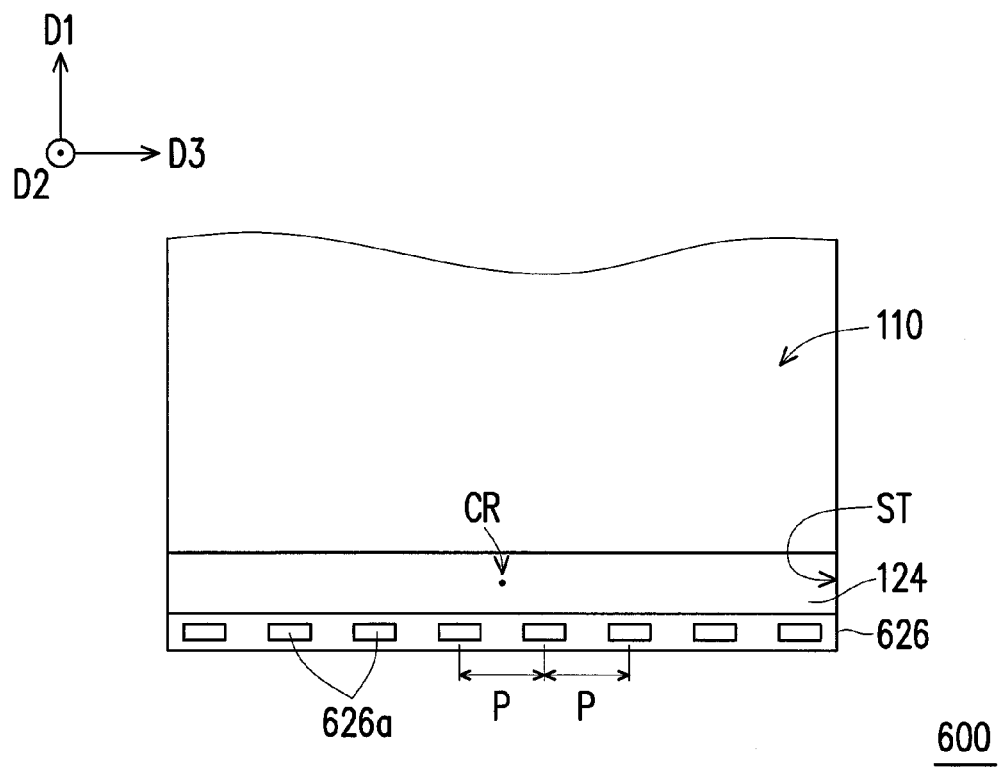
FIG. 6 is a top view of a light source module according to another embodiment of the invention.

FIG. 6 is a top view of a light source module according to another embodiment of the invention. Referring to FIG. 6, the light source module 600 and a light bar 626 of the embodiment are similar to the light source module 100 and the light bar 126 of FIG. 1A, and differences there between as described as follow. In the embodiment, the pitches P between each two of the adjacent light-emitting elements 626a are the same, and at least a part of the light-emitting elements 626a have different brightness. In detail, the brightness of a part of the light-emitting elements 626a located adjacent to the center portion CR of the collimated unit 124 is greater than the brightness of a part of the light-emitting elements 626a located adjacent to the two sides ST of the collimated unit 124. Further, in a method for implementing different brightness of the light-emitting elements 626a at the center portion CR and at the two sides ST, the power of a part of the light-emitting elements 626a located adjacent to the center portion CR of the collimated unit 124 is greater than the power of a part of the light-emitting elements 626a located adjacent to the two sides ST of the collimated unit 124. In the embodiment, a method of adjusting the power of each of the light-emitting elements 626a is, for example, to adjust a current flowing through each of the light-emitting elements 626a. In this way, since the brightness of a part of the light-emitting elements 626a located adjacent to the center portion CR of the collimated unit 124 is greater than the brightness of a part of the light-emitting elements 626a located adjacent to the two sides ST of the collimated unit 124, the brightness of the central area of the light source module 600 is obviously increased, such that the light source module 600 has similar effects and advantages with that of the light source module 100, which are not repeated.

Figure 7:
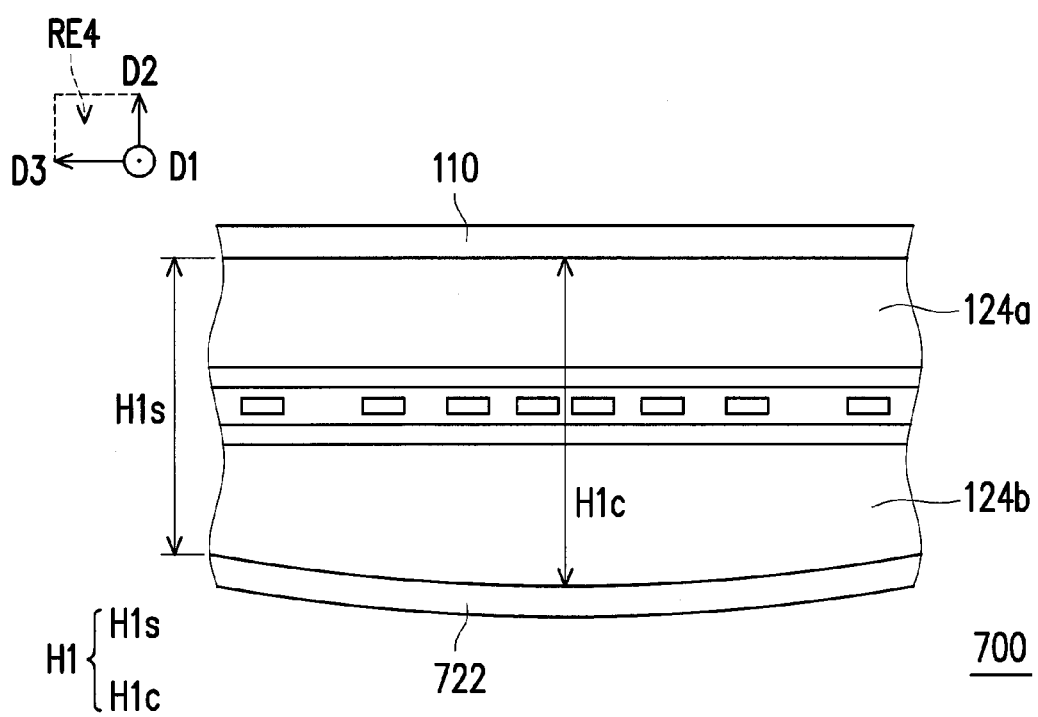
FIG. 7 is a partial cross-sectional view of a light source module according to still another embodiment of the invention.

FIG. 7 is a partial cross-sectional view of a light source module according to still another embodiment of the invention. The light source module 700 of the embodiment is similar to the light source module 100 of FIG. 1A, and a difference there between is as follows. In the embodiment, a reflecting device 722 of the light source module 700 has a variation in a two-dimensional curved surface to fine-tune the light-emitting uniformity of the light source module 700. For example, in the embodiment, a distance between the reflecting device 722 and the optical film 110 along the second direction D2 is defined as a first depth H1, and on a reference plane RE4 formed by the second direction D2 and the third direction D3, the first depth H1c corresponding to the center portion CR of the collimated unit 124 is greater than the first depth H1s corresponding to the two sides ST of the collimated unit 124. In other words, in the embodiment, the reflecting device 722 on the reference plane RE4 is gradually pulled up from the center portion CR to the two sides ST. In this way, the brightness of the light source module 700 at the two sides ST is improved, so as to enhance the light-emitting uniformity of the light source module 700.

Figure 8:
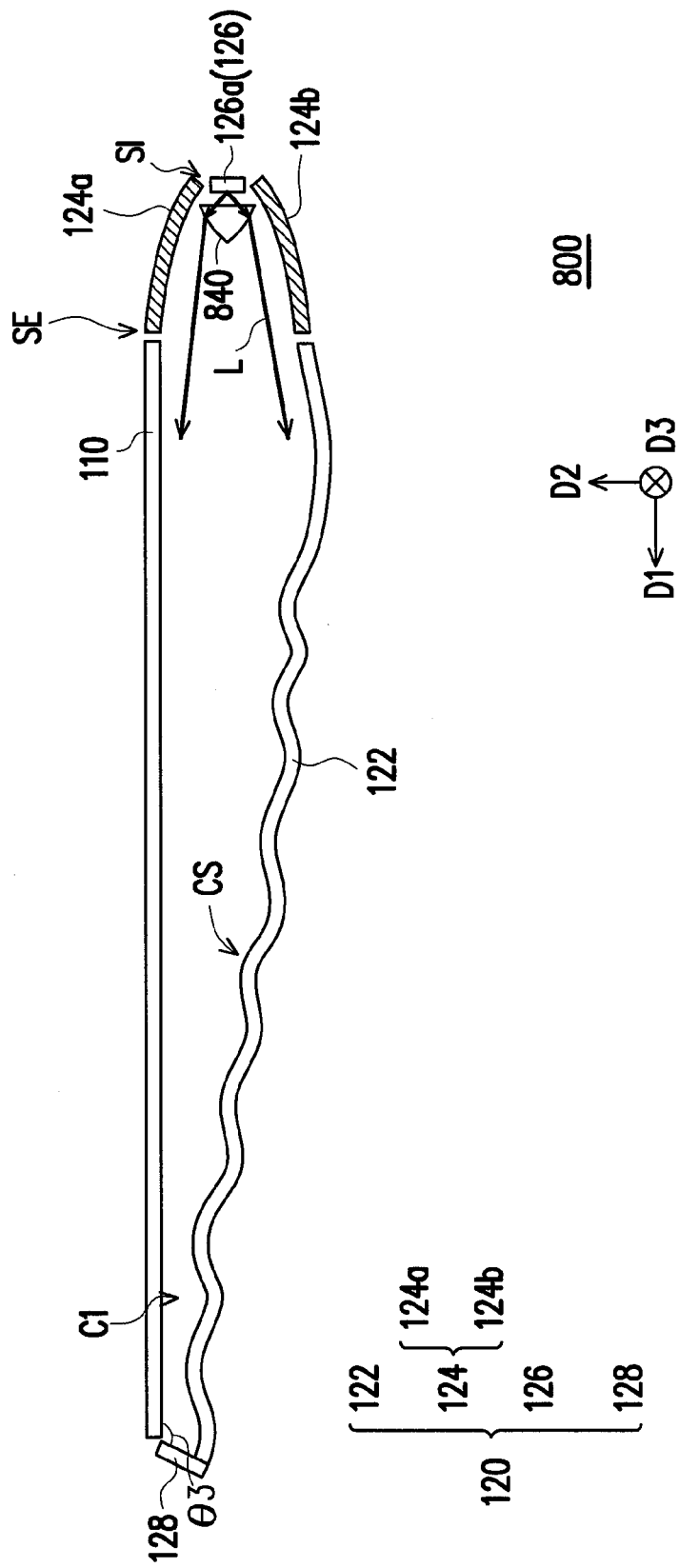
FIG. 8 is a cross-sectional view of a light source module according to yet another embodiment of the invention.

FIG. 8 is a cross-sectional view of a light source module according to yet another embodiment of the invention. The light source module 800 of the embodiment is similar to the light source module 100 of FIG. 1A, and differences there between are as follows. In the embodiment, the light source module 800 includes a plurality of secondary lenses 840. The secondary lenses 840 are disposed beside the light-emitting elements 126a, and a part of the light beam L provided by the light-emitting elements 126a is transmitted to the reflecting device 122 through the secondary lenses 840. Further, when the light beam L has a smaller divergence angle, the secondary lenses 840 can be used to adjust a distribution range of the light beam L incident to the reflecting device 122. In this way, by configuring the secondary lenses, the light-emitting uniformity of the light source module 800 is adjusted.

Moreover, through a structure design of the collimated unit 124, the light-emitting uniformity of the light source modules 400, 500, 600, 700, and 800 of the aforementioned embodiments can be effectively improved, and by configuring the reflecting device 122 and the side reflection unit 128, the light beam L is distributed to the whole reflecting device 122, which avails improving the light-emitting uniformity of the light source modules 400, 500, 600, 700, and 800. Therefore, the light source modules 400, 500, 600, 700, and 800 may have the similar effects and advantages with that of the light source module 100, which are not repeated.

In summary, the embodiment of the invention has at least one of the following advantages or effects. The light source module of the invention increases a brightness of a central area of the light source module by controlling each pitch between the light-emitting elements or the brightness of each light-emitting element. On the other hand, the light-emitting uniformity of the light source module can be effectively improved through a structure design of the collimated unit, and by configuring the reflecting device and the side reflection unit, the light beam is distributed to the whole reflecting device, which avails improving the light-emitting uniformity of the light source module. Moreover, by configuring the processor, different modes of the light source module are adjusted according to the display situation, so as to satisfy an actual requirement of image frames on wide color gamut, light-emitting efficiency and light-emitting uniformity. In addition, the uniformity of the light source module is finely tuned by adjusting the surface of the reflecting device and configuring the secondary lens. Moreover, as a light guide plate is not required, the light source module has a lower cost. In case of different brightness requirements, the light source module only needs to replace the light bar without replacing other components, so as to satisfy different brightness requirements while considering the cost and practicability of the light source module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source module, comprising:

an optical film; and at least one light source unit, wherein the at least one light source unit and the optical film enclose a space, and the light source unit comprises:

a reflecting device, disposed under the optical film;

at least one light bar, comprising a plurality of light-emitting elements, wherein a direction of an optical axis of the light-emitting elements is defined as a first direction, and a direction perpendicular to the first direction and perpendicular to the optical film is defined as a second direction, and the light-emitting elements are arranged along a third direction perpendicular to the first direction and perpendicular to the second direction;

a collimated unit, extending along a direction parallel to the third direction, and comprising:

an upper reflective portion, wherein one end of the upper reflective portion is located adjacent to the optical film, and the other end is located adjacent to the light-emitting elements; and a lower reflective portion, disposed opposite to the upper reflective portion, wherein one end of the lower reflective portion is located adjacent to the reflecting device, and the other end is located adjacent to the light-emitting elements, a shortest distance between one end of the lower reflective portion located adjacent to the reflecting device and the optical axis of the light-emitting elements along the second direction is defined as a first half light-emitting width, and the first half light-emitting width is gradually increased along the third direction from a center portion of the collimated unit towards two sides thereof, wherein the light-emitting elements are located between the upper reflective portion and the lower reflective portion.

2. The light source module as claimed in claim 1, wherein a shortest distance between one end of the upper reflective portion located adjacent to the optical film and the optical axis of the light-emitting elements along the second direction is defined as a second half light-emitting width, and the second half light-emitting width is gradually decreased along the third direction from the center portion of the collimated unit towards two sides thereof.

3. The light source module as claimed in claim 1, wherein at least one first section line of the upper reflective portion and at least one second section line of the lower reflective portion on at least one reference plane formed by the first direction and the second direction are all aspherical curves, and the at least one first section line and the at least one second section line satisfy a following equation:

$$z = \frac{y^2/R}{1 + \sqrt{1-(1+K)y^2/R^2}} + \sum_{n=2}^{10} A_{2n} y^{2n}$$

where, a z-direction is the first direction, a y-direction is the second direction, K is a conic constant, R is a radius of curvature, $A_{2n}$ is a coefficient of $y^{2n}$, n is a positive integer greater than or equal to 2 and smaller than or equal to 10, and R is a constant greater than 0.

4. The light source module as claimed in claim 3, wherein a value of K in the equation ranges from −1 to −10, a value of quartic component coefficient $A_4$ ranges from 0 to 0.1, the quartic component coefficient $A_4$ is not 0 when K=−1, and K is not equal to −1 when the quartic component coefficient $A_4$=0.

5. The light source module as claimed in claim 3, wherein the number of the reference planes is plural, the number of the first section lines is plural and the first section lines all satisfy the equation, and at least one of the value of K and the value of $A_4$ of one of the first section lines is different from the value of K or the value of $A_4$ of another first section line.

6. The light source module as claimed in claim 5, wherein the values of K of the first section lines close to the center portion of the collimated unit are smaller than the values of K of the first section lines close to the two sides of the collimated unit, or the values of $A_4$ of the first section lines close to the center portion of the collimated unit are smaller than the values of $A_4$ of the first section lines close to the two sides of the collimated unit.

7. The light source module as claimed in claim 3, wherein the number of the reference planes is plural, the number of the second section lines is plural and the second section lines all satisfy the equation, and at least one of the value of K and the value of $A_4$ of one of the second section lines is different from the value of K or the value of $A_4$ of another second section line.

8. The light source module as claimed in claim 7, wherein the values of K of the second section lines close to the center portion of the collimated unit are greater than the values of K of the second section lines close to the two sides of the collimated unit, or the values of $A_4$ of the second section lines close to the center portion of the collimated unit are greater than the values of $A_4$ of the second section lines close to the two sides of the collimated unit.

9. The light source module as claimed in claim 1, wherein each two of the adjacent light-emitting elements have a pitch there between, and at least a part of the pitches are different.

10. The light source module as claimed in claim 9, wherein the pitches located adjacent to the center portion of the collimated unit are smaller than the pitches located adjacent to the two sides of the collimated unit.

11. The light source module as claimed in claim 1, wherein pitches between each two of the adjacent light-emitting elements are the same, and brightness of at least a part of the light-emitting elements is different.

12. The light source module as claimed in claim 11, wherein the brightness of a part of the light-emitting elements located adjacent to the center portion of the collimated unit is greater than the brightness of a part of the light-emitting elements located adjacent to the two sides of the collimated unit.

13. The light source module as claimed in claim 1, wherein the light-emitting elements comprise a plurality of first light-emitting elements and a plurality of second light-emitting elements, each of the first light-emitting elements is arranged between two adjacent second light-emitting elements, and pitches between each two of the adjacent second light-emitting elements are the same.

14. The light source module as claimed in claim 13, further comprising:
a processor, electrically connected to the first light-emitting elements and the second light-emitting elements, and adjusting power of the first light-emitting elements and power of the second light-emitting elements according to a display situation.

15. The light source module as claimed in claim 14, wherein the second light-emitting element is a wide color gamut light-emitting element, the display situation comprises a high brightness mode and a wide color gamut mode, and the processor is configured to turn on the first light-emitting elements when the display situation is the high brightness mode, and turn off the first light-emitting elements when the display situation is the wide color gamut mode.

16. The light source module as claimed in claim 14, wherein the display situation comprises a high brightness mode and a low brightness mode, a ratio between power of each of the first light-emitting elements and power of each of the adjacent second light-emitting element is defined as a power ratio, and the processor adjusts the power ratio to 1 when determining the display situation to be the high brightness mode, and adjusts the power ratio to be less than 1 when determining the display situation to be the low brightness mode.

17. The light source module as claimed in claim 1, further comprising:
a side reflection unit, disposed opposite to the collimated unit, configured to connect the reflecting device and the optical film, wherein the side reflection unit, the optical film, and the light source unit enclose the space.

18. The light source module as claimed in claim 17, wherein an angle is included between the side reflection unit and the optical film, and the angle is smaller than or equal to 100 degrees and greater than or equal to 90 degrees.

19. The light source module as claimed in claim 1, wherein a distance between the reflecting device and the optical film along the second direction is defined as a first depth, and on a reference plane formed by the second direction and the third direction, the first depth corresponding to the center portion of the collimated unit is greater than the first depth corresponding to the two sides of the collimated unit.

20. The light source module as claimed in claim 1, wherein the collimated unit has a light-emitting end and a light incident end opposite to the light-emitting surface, and each of the light-emitting elements provides a light beam for entering the collimated unit through the light incident end and entering the space through the light-emitting end.

21. The light source module as claimed in claim 1, further comprising:
   a plurality of secondary lenses, disposed beside the light-emitting elements, and a part of the light beam provided by each of the light-emitting elements is transmit to the reflecting device through the secondary lenses.

* * * * *